Figure 1:
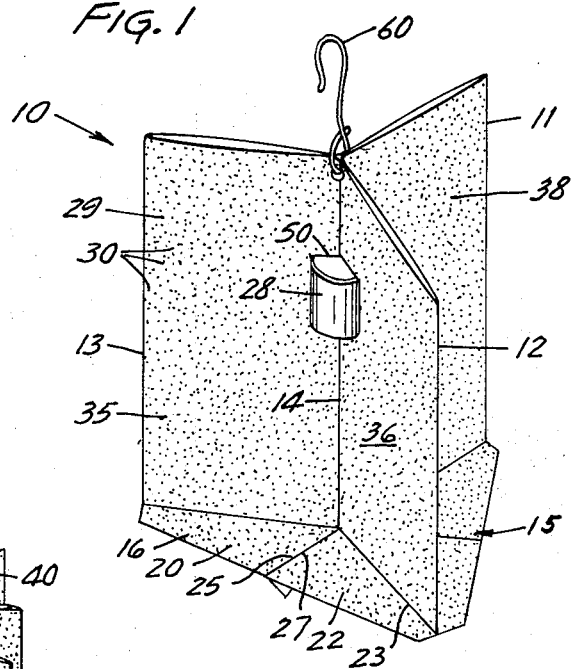

United States Patent

Bradshaw

[15] 3,685,199
[45] Aug. 22, 1972

[54] INSECT TRAP

[72] Inventor: Thomas I. Bradshaw, Shoreview, Minn.

[73] Assignee: Minnesota Mining and Manufacturing Company, St. Paul, Minn.

[22] Filed: Sept. 24, 1970

[21] Appl. No.: 74,977

[52] U.S. Cl. ................................................. 43/114
[51] Int. Cl. ............................................... A01m 1/14
[58] Field of Search ...................... 43/114, 115, 136

[56] References Cited

UNITED STATES PATENTS 1,645,715   10/1927   Northrup ..................... 43/115
813,196   2/1906   Bien ........................... 43/114

Primary Examiner—Warner H. Camp
Attorney—Kinney, Alexander, Sell, Steldt & Delahunt

[57] ABSTRACT

A disposable, collapsible insect trap comprising a suitable flexible material folded into a configuration characterized by three or more vanes surrounding a central axis, thereby exposing a relatively large surface area which has thereon an insect attractant and a tacky material to hold insects on said trap after they are attracted thereto.

4 Claims, 4 Drawing Figures

PATENTED AUG 22 1972

3,685,199

INVENTOR.
THOMAS I. BRADSHAW
BY Kinney, Alexander,
Sell, Steldt & De La Hunt
ATTORNEYS

INSECT TRAP

BACKGROUND OF THE INVENTION

The present invention relates to a disposable, collapsible device for trapping insects. More particularly, the invention relates to an insect trap which traps insects through the use of an insect attractant and a tacky substance to hold the insects to the trap when attracted thereto. The substances used to attract and hold the insects to the trap are not hazardous to animals and the trapping device itself is economical, easy to use, and may be easily disposed of after use.

Insects, even though there have been many technical advances in entomology, still present a serious problem both hygenically and economically. Insects attack food-producing plants and their produce, transport disease-producing organisms, cause pain and discomfort by bites and stings, and are nuisances in many other ways. Various methods have been devized in an attempt to control various insect pests but have not always been found to be satisfactory for many applications. Most chemical insecticides are toxic and hazardous to birds, fish, animals, and even humans in relatively small amounts. Even extremely minute amounts are hazardous to some species. The damage caused to the environment by chemical insecticides is sometimes greater than the total benefit obtained through their use. Thus, the search has continued for economical, effective, specific, convenient and non-hazardous methods to control insects.

There are, at present, insect trapping devices which employ chemical insecticides therein. An example of such a device is described in U.S. Pat. No. 3,173,223. None of the known devices, however, are practical for large scale trapping and killing of insects as they are generally bulky and inconvenient to transport and store and many are also complex and expensive to use. Further, the devices used at present are not effective for a wide variety of applications.

SUMMARY OF THE INVENTION

According to the present invention, a convenient, disposable insect trapping device is provided which is inexpensive and ideally suited for large scale trapping of insect pests. The device contemplates the use of a collapsible device having on at least one surface thereof, an insect attractant in combination with a tacky substance to hold the insect to the trap after it has been lured by the attractant.

The insect trapping device of the present invention comprises generally a collapsible structure having at least three generally elongated projecting surfaces radially extending from a common axis and a tacky insect-entangling substance on at least a portion of the projecting surfaces to hold insects to the trap upon contact with the tacky substance. The trap may also contain an attractant to draw insects thereto.

Figure 2:
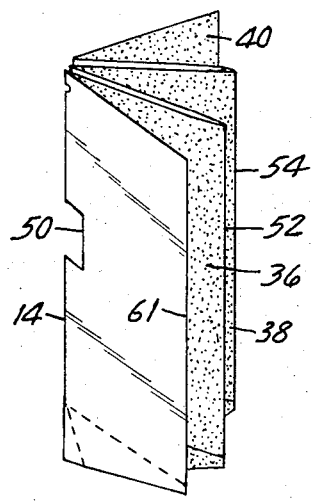
Figure 3:
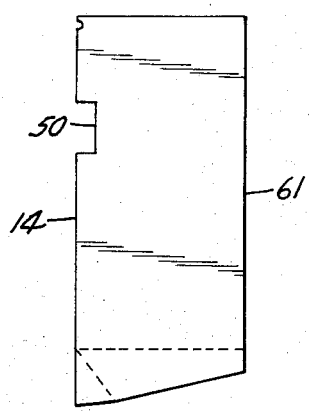
Figure 4:
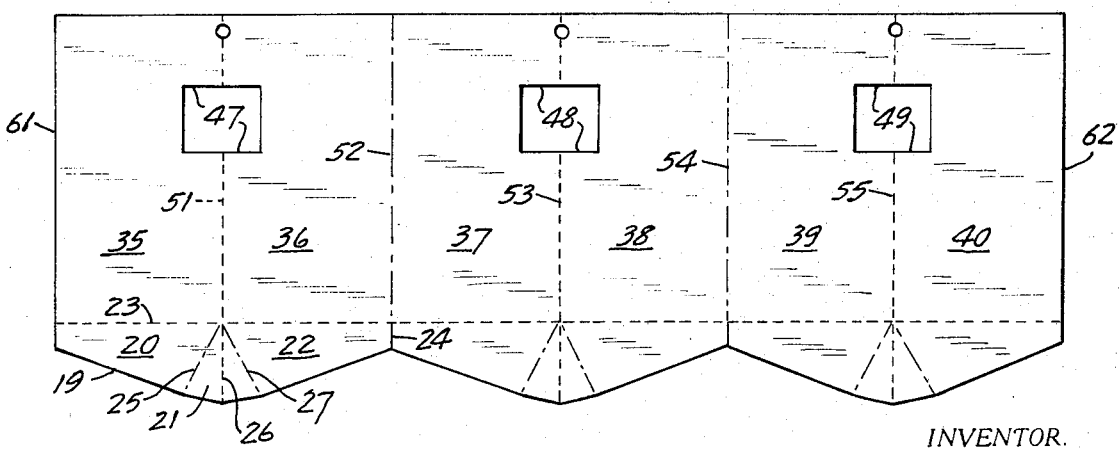

The invention will be better understood with reference to the drawings wherein:

FIG. 1 is a perspective view of one embodiment of the insect trapping device of the present invention, FIG. 2 is a view of the trap of FIG. 1 in a semi-collapsed or partially opened state, FIG. 3 is a view of the trap of FIG. 1 in a collapsed, packaged state, and FIG. 4 is a view of the device of FIG. 1 after cutting and creasing is completed but before assemblage of the trap.

Referring to the drawings, particularly FIG. 1, the insect trapping device 10 of the invention comprises essentially a structure having a series of radially extending projecting surfaces or vanes 11, 12 and 13 having a common axis 14, the vanes being linked or connected at one end by connecting members 15 and 16 and a member at the back (not shown) which are essentially perpendicular to the vanes. The connecting members serve to keep the vanes relatively equidistant and increase the structural stability of the trap. The device further has a hanging device 60, a container 28 for insect attractant located centrally in the device and a tacky insect entangling substance 29 on the surface of the device. The attractant may also be present in the form of small droplets 30 or globules anywhere on the exposed surfaces, thus eliminating the need for a container and an aperture in the trap.

The insect trap of the present invention may be conveniently collapsed for storage and shipping into a small, compact unit as illustrated in FIGS. 2 and 3, and reopened into a usable trap whenever the user wishes merely by opening the trap and fastening the supporting members into a generally perpendicular shelf. Preferably, the supporting members are pre-formed and remain so in the packaged state so that only the vanes have to be attached.

Various means can be used to give structural support to the trap other than the horizontal shelf connecting members as illustrated, although such construction is preferred as it aids in catching insects that might fall off the vertical members. Such other means would be plastic or metal braces or brackets, clips, and the like.

The number of vanes or projecting surfaces must be at least three in order to obtain stability of the trap, and may be increased to four, five, six or more. As the number of vanes increases from three, the overall size of the trap becomes important. The limiting factor is that the space between the exterior edges of the vanes must be sufficiently wide to enable the insect species to enter and contact the tacky substance. A further consideration is the increasing complexity of making the trap as the number of vanes is increased. Also, the insect entrapping surface area may be increased substantially by the addition of more projecting surfaces. Thus, depending on the species of insect to be trapped, the above mentioned factors should be considered in choosing the most efficient number of vanes.

The assemblage of the trap of the present invention is simple and convenient and is best illustrated with reference to FIG. 4. The insect entangling material is preferably deposited on the trap before assemblage but may also be deposited thereafter. A flat elongated sheet of a flexible, semi-rigid material is cut as shown in FIG. 4 and fold lines are placed at 51, 52, 53, 54, 55, 23, 25, 26 and 27. Three holes, 47, 48 and 49 are cut in a generally central location. The trap, both in its assembled and collapsed position, then has six exposed surfaces, in addition to the connecting members 15 and 16 and have the numbers 35, 36, 37, 38, 39, and 40. When the trap is to be assembled, folds 51, 53 and 55 are bent in a downward position while folds 52 and 54 are bent in an upward position. Ends 61 and 62 are then brought around until they are flush with each other and fastened so that sides 35 and 40 are directly opposed. At this point, fold lines 51, 53 and 55 are in contact centrally in the device and form a common axis 14. Also, apertures 47, 48 and 49 meet at the central axis to form a three dimensional aperture 50 which may be used to hold an insect attractant container 28. At this point, vanes 11, 12 and 13 are formed.

The connecting members are then formed by folding fold line 26 downward and lines 25 and 27 upward, bringing lines 25 and 27 together and folding the entire connecting member 16 upward along line 23. A small cut may be inserted at 24 to facilitate the folding procedure. When folds 25 and 27 are brought together, they are fastened (with tape or glue) and form the complete connecting member 16 as illustrated in FIG. 1. A hanging device, such as a wire hook 60 is then attached to the top of the device serving to hold the vanes together and also to hang the device in its desired location.

The perpendicular members 15 and 16 are formed to cause the perpendicular configuration by adjusting the angles 20, 21 and 22. Thus, for a three vane device, the angles are each 60° and angle 21 is divided in half when making the center fold along line 26 into two 30° angles. If a four vane device is desired, angles 20 and 22 would each be 45° and angle 21 would be 90°. Each of angles 20 and 22 will, in each case, equal (180°/number of vanes) and angle 21 will equal 180° less the total of 20 and 22 (in degrees).

The exterior edge 19 of the perpendicular members may be in any convenient conformation such as straight or rounded. The edges need not conform to folds 25, 26, and 27, although it has been found convenient that the edges do so conform. It is generally most convenient that the vanes 11 12, and 13 be generally rectangular, although various configurations would be obvious to one skilled in the art.

The insect trapping device of the present invention, when in its disassembled state, comprises generally then a flat, elongated sheet of a flexible, semi-rigid material having fold lines located at intervals corresponding to about one-sixth the length of the sheet, the ends of the sheet being attached to form a collapsed structure having at least three projecting surfaces extending from a common axis, the surfaces being in close proximity when the device is in a flat, collapsed position; a tacky, insect-entangling material disposed on the surfaces forming a continuous layer between the surfaces; and means attached to the device for the hanging thereof in a desired location; whereby, the structure may be manipulated to form a trap having at least three projecting surfaces radially extending from a common central axis, the surfaces having the tacky material disposed thereon for catching and holding insects.

Although perpendicular members are illustrated at the base of the device, they could also be at the top of the device either alone or in combination at both top and bottom. The placement of the supporting members is clearly an optional variation of the basic design, and may be varied depending upon the insect to be trapped, the environment and the weather in which the trap is to be used. For example, the perpendicular supporting members may serve as an additional trapping surface if desired as illustrated in the device of FIG. 1. Falling leaves or other debris, and/or excess precipitation may suggest or require the use of perpendicular members at the top of the trapping device.

The insect trap may be mounted in numerous ways, preferably by employing a hanging device 60 which is pivotally attached to the trap at or near the top. Such a hanging device may be inserted in the device during manufacture or may be thereafter clamped, glued, stapled, or otherwise fastened to the device. The hanging device 60 is then merely placed over some object in the area in which insect control is sought, e.g., the branch of a tree. The trap could, however, also be set in any appropriate holder and fastened thereto to obtain a stable configuration without support. The trap may also be fastened to any available material, such as a fence, in the area in which insect control is sought.

The collapsibility of the trap is a distinct advantage as large numbers of such traps may be taken into the field at one time due to the small bulk of the trap in the collapsed state whereas large bulky traps use up quite a large amount of space both during shipment and when taking them into the field to be used. There may also be one or more additional tabs attached to the edges 61 and 62 to facilitate this procedure. It is further preferred that the hanging device, or part of the hanging device, be sufficiently flexible to allow it to be bent and closed tightly over a projection when it is suspended therefrom such as the tree limb, nail, wood rod, or the like. Although a metal hanging device is preferred and is readily available for most applications, any suitable material may be used.

Materials from which a collapsible container 10 may be constructed include sheets of semi-rigid plastic; for example polyethylene, polypropylene, and the like; metal foil, such as aluminum foil; or preferably paper, which may be treated to render such paper essentially grease and water proof. Paper is preferred because it is inexpensive, easy to work with, light and renders the trap more easily disposable. The paper should be of sufficient weight to maintain dimensional stability, for example, 0.009 inch tag stock which may be treated with wax, polyethylene, silicones, and the like to give a grease and rain resistant surface. The grease-resistant surface is desirable to resist migration of the tacky substance coated on the inner walls into the paper which would decrease its availability to insects flying into the trap. Water resistance is desirable as the trap will very often be exposed to rain, dew, or other moisture phenomena. Although the color of the paper is not known to be critical, it may be expected that either dark or light colors may prove advantageous for certain insects.

The tacky substance 29 which catches and thus kills insects is placed on the projecting surfaces of the insect trapping device during manufacture and generally on the perpendicular members such as at planes 35, 36 and 38. The material used must maintain its tackiness when exposed to environmental conditions, such as wind, rain, etc. Examples of such substances are solutions of gum, rubber, and mineral oil, polybutenes, and mixtures of wax and resins. The substance is coated on the surfaces of the device, generally before the connecting members 15 and 16, or shelves are formed. Preferably, the tacky material is coated on all of the outer vertical and on top of the horizontal surfaces as illustrated, or on any appropriate surface depending on the location of the vanes and supporting members.

The insect attractant which is used may be any suitable substance which attracts one or more species of insects. Said substances include sex (or mating) attractants, swarming attractants, feeding attractants, and the like. Known sex attractants include riblure, propylure, hexylure and grandlure. The attractants may be effective by themselves, may require a synergist or may be used in combinations. The type of attractant used will depend entirely upon the type of insects desired to be trapped and would be obvious to those skilled in the art. Generally, such substances are naturally occurring and substantially nontoxic.

The attractant may be placed in the trap in a manner designed to permit its gradual, as well as immediate, release. Various methods are available. The attractant may be mixed with melted paraffin wax and the mixture is applied to the outer surface of the trap as droplets 30 before or after the tacky substance 29 is applied allowing the mixture to solidify. The paraffin used may have a high or low melting point depending upon the conditions to which it will be exposed, since it is preferable that it remain solid. Another method of holding the attractant in the device is to place it in a plastic container, seal the container, and at the time the trap is set or assembled, place the container in the tacky substance. This generally holds such container securely. The material used for the container must be such that the attractant will be allowed to diffuse therethrough. Other methods useful for permitting the gradual release of the attractant include encapsulation with plastic or glass bubbles, and incorporation within the container material. If desired, a colorant or dye may be added to the attractant mixture in order to clearly indicate its presence to those using the trap.

A particularly useful method of baiting the trap is illustrated in FIG. 1. An attractant is placed in a cylindrical container 28 and at the time the trap is assembled for use, the container is inserted into the aperture 50. The trap is then assembled by joining surfaces 35 and 40 so that edges 61 and 62 are nearly flush with one another. One convenient method for joining the places is to apply one face of a double-backed tape to one of the surfaces 35 and 40. The other face of the tape is covered by a protective liner until the trap is to be used when the liner is removed and the surfaces are attached. Other methods such as clamping, stapling, gluing and the like could also be used.

When a cylindrical attractant container is used, the container may contain an attracting chemical substance or mixture of such substances or a live insect such as a boll weevil. The trap of the present invention is particularly suitable as a boll weevil trap.

The invention will be further illustrated by reference to the following illustrative example.

EXAMPLE

Insect traps according to the present invention were prepared as follows: a 8.5 inch by 21 inch piece of card designated 0.009 inch bleached tag stock available from H. P. Smith Paper Co., Chicago, Illinois was coated on both sides with polyethylene to make it water and grease proof. The card was cut and scored for folding as shown in FIG. 4. The paper was then coated with a tacky substance, "Bird Tanglefoot", available from the Tanglefoot Co., Grand Rapids, Michigan. The tacky substance consists of 97 percent polybutenes and 3 percent hydrogenated castor oil. Eighteen grams of the tacky substance were coated on the entire surface of one side of the card. Three apertures were cut in the card as illustrated in FIG. 4.

The card was then folded and hinged with self-adhesive or double-stick tape with the surfaces having the tacky material thereon facing each other. The outer surfaces were thus free from the tacky material. The angular three members at the bottom of the card, as shown by the fold lines, were taped independently so as to hold the bottom-most triangular section together. Thus, when the trap was unfolded through 360°, about the central axis, the bottom members opened, formed a perpendicular shelf in the space between the three vertical vanes or projecting surfaces so formed. The outer panels were bonded together with double-backed, self-adhesive tape to form the third vane.

A soft-wire hook was attached to the opened trap through a small hole near the top of the central axis.

A cylindrical container, containing riblure, 2 inches in diameter and 1.25 inches deep is placed in the cut out section prior to joining the outer vanes together. When these vanes were joined, the container is locked into place, i.e., it could not be removed without detaching the outer vanes and folding them back.

The traps are then placed in trees in an orchard where there is a noticeable population of red banded leaf roller. The traps, checked periodically, were considered to be an effective means of trapping this insect.

What is claimed is:

1. A collapsible insect trapping device, comprising:
a single, flat, elongated, generally rectangular sheet of a flexible, semi-rigid material having at least five fold lines across the width of said sheet at right angles to the long axis thereof and located at intervals corresponding to about one-sixth of the length of said sheet, the said sheet being folded upon itself in successive alternate directions on said fold lines and adaptable to being attached to itself at the point where said alternate folds meet to form a common axis, thus to form a collapsible or expandable structure having at least three projecting vanes extending from said common axis, having means to connect said projecting vanes to each other at at least one end to keep said vanes essentially equidistant from each other and to increase the structural stability of the trap; and
a tacky, insect-entangling substance on at least a portion of the surfaces of said projecting vanes to hold insects to the trap upon contact with said substance.

2. A disposable, collapsible insect trapping device, comprising:
a single, flat, elongated, generally rectangular sheet of a flexible, semi-rigid material having at least five fold lines across the width of said sheet at right angles to the long axis thereof and located at intervals corresponding to about one-sixth of the length of said sheet, the said sheet being folded upon itself in successive alternate directions on said fold lines and adaptable to being attached to itself at the point wherein said alternate folds meet to form a common axis, thus to form a collapsible or expandable structure having at least three projecting vanes extending from said common axis, and having generally triangularly shaped portions along one edge of said sheet, each portion bridging two adjacent areas defined by said fold lines, and including one fold line, the included fold line running to the apex of each triangular portion; a fold line extending the full length of said sheet parallel to the long axis thereof and adjacent to the base of all said triangular portions; and two fold lines in each of said triangular portions running from the junction of the said full length fold line and said included fold line to points on either side of said apex so that when said sheet is in folded, expanded position the said triangular portions can be folded outwardly between said vanes to a position at right angles to said common axis and substantially flat so as to hold said sheet in expanded position; the elongated sheet being folded so that adjacent surfaces of said vanes are in close proximity when said device is in a flat, collapsed position;

a tacky, insect-entangling material disposed on the outer surfaces of said vanes and forming a substantially continuous layer thereon;

whereby said structure may be manipulated to form a trap having at least three projecting vanes radially extending from a common central axis, the surfaces of said vanes having said tacky material disposed thereon for catching and holding insects.

3. The device of claim 2 further having an attractant thereon to draw insects to said trapping device.

4. The device of claim 2 wherein said structure is constructed of greaseproof and waterproof paper.

* * * * *